United States Patent [19]

Pittman

[11] 3,915,240
[45] Oct. 28, 1975

[54] MANUAL EARTH WORKING HOE

[76] Inventor: Chester L. Pittman, 619 E. Walker St., Melbourne, Fla. 32935

[22] Filed: Apr. 19, 1974

[21] Appl. No.: 462,558

[52] U.S. Cl. .................. 172/371; D8/11; 172/375; 172/376; 172/377; 172/381
[51] Int. Cl.² .......................... A01B 1/10
[58] Field of Search .............. 172/371, 375–381, 172/13; D8/11

[56] References Cited
UNITED STATES PATENTS

| 187,744 | 4/1960 | Mendenhall | 172/378 X |
|---|---|---|---|
| 971,000 | 9/1910 | Fleming | 172/13 |
| 1,594,984 | 8/1926 | Stafford | 172/376 |
| 1,886,178 | 11/1932 | Goddard | 172/376 X |
| 2,446,512 | 8/1948 | Miller | 172/376 X |
| 3,044,560 | 7/1962 | Loomis | 172/375 |

FOREIGN PATENTS OR APPLICATIONS

| 134,012 | 10/1919 | United Kingdom | 172/375 |
|---|---|---|---|
| 7,448 | 1/1907 | United Kingdom | 172/375 |
| 1,089,326 | 11/1967 | United Kingdom | 172/371 |
| 213,586 | 2/1941 | Switzerland | 172/375 |
| 129,333 | 7/1932 | Germany | 172/375 |

Primary Examiner—Edgar S. Burr
Assistant Examiner—Steven A. Bratlie
Attorney, Agent, or Firm—Warren E. Ray

[57] ABSTRACT

A manual earth working hoe having a handle connected to a metal rectangular box-like structure with left and right side forward edges sharpened and with the bottom of the structure extending forward in a triangular shape having a point and having sharpened edges. The right side of the triangularly shaped forward structure is substantially colinear with the right side of the box-like structure for use adjacent a sidewalk, building, or the like, while the left side thereof projects outwardly with respect to the left side of the box-like structure. A pair of root cutters with sharpened forward edges depend vertically downward from the rectangular box-like structure.

3 Claims, 3 Drawing Figures

MANUAL EARTH WORKING HOE

BRIEF SUMMARY OF THE INVENTION

This invention relates to a manual earth working hoe having numerous sharpened members not hitherto known in the prior art. The apparatus is provided with a pair of downward vertically depending cutting elements particularly suitable for cutting roots. The hoe is particularly advantageous for eliminating weeds and grass under flowers and shrubs since it may be easily inserted under the branches and moved to and fro without the need for the vertical movement involved in the chopping action usually associated with the conventional hoe.

The primary object of the invention is the provision of apparatus involving horizontal movements rather than the conventional vertical chopping action.

Another object is the provision of downward vertically depending root cutting members for cutting lateral roots or runners particularly useful in removing a section of lawn grass for preparation of, say, a flower bed.

Still another object is the provision of a triangular cutting portion as an extension of the bottom member of a rectangular box-like structure with open ends for passage of earth wherein one side is colinear with the box side for work close to an obstruction and wherein the other side projects outwardly from a box side.

Further objects and advantages of my invention will be apparent from the following detailed description taken in conjunction with the accompanying drawing in which:

BRIEF DESCRIPTION OF THE SEVERAL VIEWS OF THE DRAWING

Similar reference numerals are applied to similar elements throughout the drawing.

DETAILED DESCRIPTION

Figure 1:
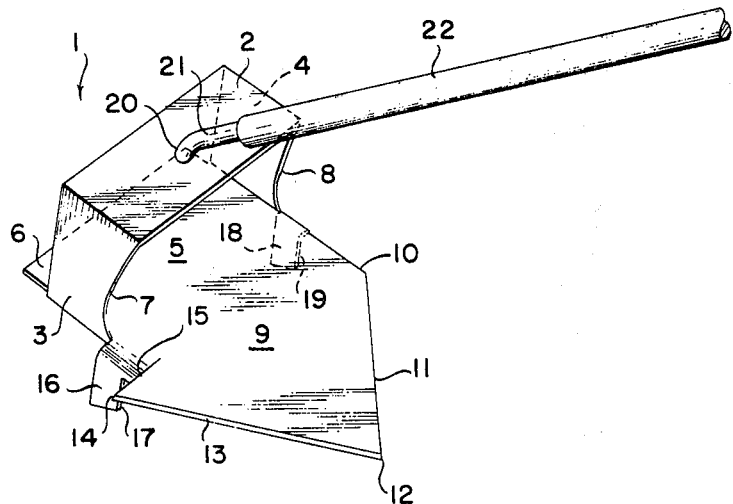
FIG. 1 is a pictorial view of the manual earth working hoe.
Figure 2:
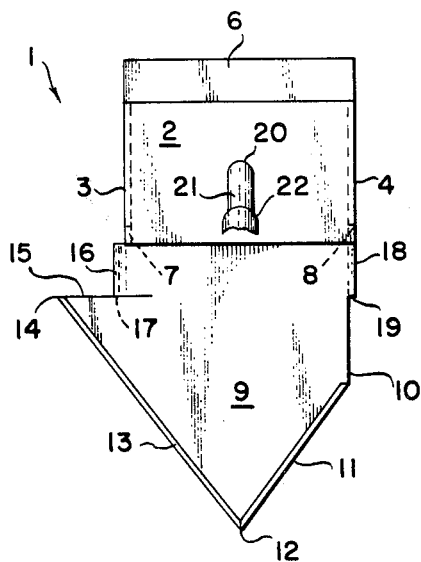
FIG. 2 is a top view of the hoe with most of the handle removed.

The manual earth working hoe is indicated generally in all of the figures by the numeral 1. In the pictorial view of FIG. 1 the metal rectangular box-like structure with forward and aft sides omitted comprises a top member 2 to which is affixed the end 20 of handle receiver 21 in turn receiving a handle 22, e.g., of wood, as is conventional. A bottom member 5 with a rear extension 6 is connected to the top member 2 by a left side 3 having a front, curved, sharpened edge 7, and by a right side 4 also having a front, curved, sharpened edge 8. The box bottom member 5 continues forwardly with a front projecting portion 9 to a point 12. The angled portion of projecting member 9 is provided with sharpened edges 11 and 13. It will be noted that the projecting portion 9 is provided with a straight portion 10 substantially colinear with the box side 4 for close in work adjacent an obstruction as a sidewalk or a building wall while the left side of 9 is provided with a projecting end 14 having a back member 15 for covering a greater width of ground in use in weeding a plot. Depending vertically downward from the metal box bottom 5 and the front projecting extension 9 are a pair of lateral root cutters 16, 18 having a slightly curved front sharpened cutting edges 17, 19. As seen in FIG. 1 each root cutter may be provided with a foot sloping downward slightly from front to rear. These root cutters are especially useful for cutting lateral roots when removing a section of lawn grass, but are also useful when weeding an established plot or garden, especially adjacent the borders thereof.

Figure 3:
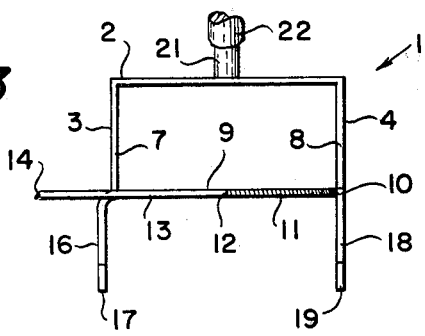
FIG. 3 depicts a front view of the hoe again with most of the handle omitted.

In the top view of FIG. 1 and in the front view of FIG. 3 the reference numerals thereon are used to indicate the same elements as described with reference to FIG. 1.

The hoe part of the apparatus may be made from heavy sheet steel of a quality that will hold the sharpened edges reasonably well. The dimensions are not critical, but it has been found that a useable hoe may have nominal dimensions of 5 inches width for top 2, 2½ inches width for sides 3, 4, and depth from front to rear of 3 inches. The measurement from the rear edge of rear extension 6 to the point 12 may be 9½ inches. The depending root cutters 16, 18 may be 1 inch long and vary from three-quarters to 1 inch in width. The angle between the handle 22 and the top 2 may be about 45°.

In utilization the hoe is not used in a chopping action, but is used more like a garden plow, that is to say, with much more horizontal action than vertical action. It might also be likened to a shovel with the handle reversed. This feature permits the weeding of, say, a flower bed wherein the flowers have low branches whereby a conventional hoe could not be utilized. The sharpened edges 7, 8 will cut runners and vines while the sharpened edges 17, 19 on depending root cutters 16, 18 will cut lateral roots underground. The sharpened edges 11, 13 on front member 9 cut vertical roots or whatever material is in front of its path as the hoe is pulled forward by means of the handle. The projecting end 14 on the left side is omitted on the right side whereby the straight portion 10 of member 9 permits close work adjacent a sidewalk or a building wall.

While for purposes of description I have shown and described a specific embodiment of my invention, it will be apparent that changes and modifications can be made therein without departing from the spirit of my invention or the scope of the appended claims.

I claim:

1. A manual earth working hoe comprising a rectangular box-like structure (1) having a top member (2), a handle (22) attached to said top member (2) at an angle thereto, said rectangular box-like structure (1) including, viewed from the handle (22) end of the hoe, a left side member (3) connected to said top member (2) having a forward sharpened cutting edge (7) facing said handle (22), a right side member (4) connected to said top member (2) having a forward sharpened cutting edge (8) facing said handle (22), a bottom member (5) connected to said left and right side members (3, 4) and substantially parallel to said top member (2), said bottom member (5) having a projection (9) substantially in the same plane extending generally toward said handle (22) including sharpened cutting edges (11, 13), said rectangular box-like structure (1) further including left and right root cutters (16, 18) having sharpened cutting edges (17, 19) depending downwardly from said bottom member (5) substantially in extension of the planes of said side members (3, 4), said projection (9) having a common planar straight portion (10) extending forwardly and substantially coplanar with said right side member's (4) edge (8) for permitting work close to an obstruction such as the side of a building, said manual earth working hoe further including a second projection (14) substantially in the plane of and connected to the said bottom member (5) and said projection (9) and extending to the left of said left member's (3) forward edge (7).

2. A manual earth working hoe according to claim 1 wherein said bottom member (5) projection (9) with sharpened cutting edges (11, 13) is angularly shaped coming to a point (12).

3. A manual earth working hoe according to claim 1 wherein said bottom member (5) includes an extension (6) connected to and substantially in the plane of said bottom member (5) extending rearwardly of said left and right side members (3, 4) of said rectangular box-like structure (1) with respect to the handle (22).

* * * * *